US010917211B2

(12) United States Patent
John Wilson et al.

(10) Patent No.: US 10,917,211 B2
(45) Date of Patent: Feb. 9, 2021

(54) TECHNIQUES AND APPARATUSES FOR REUSING REMAINING MINIMUM SYSTEM INFORMATION CONFIGURATION BITS TO SIGNAL A SYNCHRONIZATION SIGNAL BLOCK LOCATION

(71) Applicant: QUALCOMM Incorporated, San Diego, CA (US)

(72) Inventors: Makesh Pravin John Wilson, San Diego, CA (US); Tao Luo, San Diego, CA (US); Hung Dinh Ly, San Diego, CA (US); Heechoon Lee, San Diego, CA (US); Peter Gaal, San Diego, CA (US); Muhammad Nazmul Islam, Littleton, MA (US); Wanshi Chen, San Diego, CA (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/428,033

(22) Filed: May 31, 2019

(65) Prior Publication Data

US 2019/0288813 A1    Sep. 19, 2019

Related U.S. Application Data

(63) Continuation of application No. PCT/US2018/031207, filed on May 4, 2018, which is
(Continued)

(51) Int. Cl.
*H04L 12/28* (2006.01)
*H04L 5/00* (2006.01)
(Continued)

(52) U.S. Cl.
CPC ........ *H04L 5/0048* (2013.01); *H04J 11/0073* (2013.01); *H04J 11/0076* (2013.01);
(Continued)

(58) Field of Classification Search
CPC ............... H04W 56/00; H04L 27/2613; H04L 27/2657; H04J 11/0073; H04J 11/0086
(Continued)

(56) References Cited

U.S. PATENT DOCUMENTS 8,326,294 B2   12/2012   Narang et al.
9,166,718 B2   10/2015   Chen et al.
(Continued)

FOREIGN PATENT DOCUMENTS

CN   101621308 A   1/2010
CN   102710579 A   10/2012
(Continued)

OTHER PUBLICATIONS

CATT: "Offline Summary for Al 7.1.2.2 Remaining Details on Remaining Minimum System Information", 3GPP TSG RAN WG1 Meeting #90bis, R1-1719145, Prague, CZ, Oct. 9-13, 2017, pp. 1-15.
(Continued)

*Primary Examiner* — John Pezzlo
(74) *Attorney, Agent, or Firm* — Qualcomm IP Dept.; James Hunt Yancey, Jr.

(57) ABSTRACT

Various aspects of the present disclosure generally relate to wireless communication. In some aspects, a user equipment (UE) may receive a first synchronization signal (SS) block that does not include remaining minimum system information (RMSI). The first SS block may indicate an offset for obtaining a second SS block that includes RMSI. The UE
(Continued)

US 10,917,211 B2

Page 2 may determine a location of the second SS block based at least in part on the offset. Numerous other aspects are provided.

30 Claims, 10 Drawing Sheets

Related U.S. Application Data a continuation of application No. 15/968,569, filed on May 1, 2018, now Pat. No. 10,270,573.

(60) Provisional application No. 62/710,295, filed on Feb. 16, 2018, provisional application No. 62/595,028, filed on Dec. 5, 2017, provisional application No. 62/591,116, filed on Nov. 27, 2017, provisional application No. 62/506,960, filed on May 16, 2017.

(51) Int. Cl.
  *H04J 11/00* (2006.01)
  *H04L 27/26* (2006.01)
  *H04J 1/16* (2006.01)

(52) U.S. Cl.
  CPC ........ *H04J 11/0086* (2013.01); *H04L 5/0091* (2013.01); *H04L 27/2613* (2013.01); *H04L 27/2675* (2013.01); *H04L 27/2692* (2013.01)

(58) Field of Classification Search
  USPC ................................ 370/252, 329, 386, 503
  See application file for complete search history.

(56) References Cited

U.S. PATENT DOCUMENTS

| | | | |
|---|---|---|---|
| 10,270,573 B2 | 4/2019 | John Wilson et al. | |
| 10,285,120 B2 | 5/2019 | Lee et al. | |
| 10,499,421 B2 | 12/2019 | Luo et al. | |
| 10,581,569 B2 | 3/2020 | Damnjanovic et al. | |
| 2008/0192845 A1 | 8/2008 | Aizawa et al. | |
| 2012/0281594 A1 | 11/2012 | Stewart et al. | |
| 2013/0058240 A1 | 3/2013 | Kim et al. | |
| 2013/0143502 A1 | 6/2013 | Kazmi et al. | |
| 2014/0128085 A1 | 5/2014 | Charbit | |
| 2016/0043849 A1 | 2/2016 | Lee et al. | |
| 2016/0308637 A1 | 10/2016 | Frenne et al. | |
| 2017/0094624 A1 | 3/2017 | Balachandran et al. | |
| 2017/0280484 A1 | 9/2017 | Awad | |
| 2018/0084593 A1 | 3/2018 | Chen et al. | |
| 2018/0159649 A1 | 6/2018 | Sun et al. | |
| 2018/0167155 A1 | 6/2018 | Sun et al. | |
| 2018/0167946 A1 | 6/2018 | Si et al. | |
| 2018/0192383 A1* | 7/2018 | Nam ..................... | H04L 5/0044 |
| 2018/0192412 A1 | 7/2018 | Novlan et al. | |
| 2018/0199343 A1 | 7/2018 | Deogun et al. | |
| 2018/0262977 A1 | 9/2018 | Lee et al. | |
| 2018/0278314 A1 | 9/2018 | Nam et al. | |
| 2018/0324678 A1 | 11/2018 | Chen et al. | |
| 2018/0324732 A1* | 11/2018 | Park ................... | H04W 56/0015 |
| 2018/0337755 A1 | 11/2018 | John Wilson et al. | |
| 2019/0098591 A1 | 3/2019 | Wu et al. | |
| 2019/0223090 A1 | 7/2019 | Lee et al. | |
| 2019/0288813 A1 | 9/2019 | John et al. | |
| 2019/0394751 A1 | 12/2019 | Park et al. | |
| 2020/0068512 A1* | 2/2020 | Xue .................... | H04W 56/001 |
| 2020/0274750 A1* | 8/2020 | Yi ....................... | H04L 27/2613 |

FOREIGN PATENT DOCUMENTS

| | | |
|---|---|---|
| CN | 104412525 A | 3/2015 |
| CN | 104486056 A | 4/2015 |
| CN | 104782217 A | 7/2015 |
| TW | 201349813 A | 12/2013 |
| WO | 2011062957 A1 | 5/2011 |
| WO | 2015142555 | 9/2015 |
| WO | 2016028518 A2 | 2/2016 |

OTHER PUBLICATIONS

Huawei: "Email discussion [86b-20] on synchronization and carrier rasters for NR," 3GPP Draft; R1-1611684, Email Discussions 86B-20 on Synchronization and Carrier Rasters for NR V5, 3rd Generation Partnership Project (3GPP), Mobile Competence Centre; 650, Route Des Lucioles; F-0692, vol. RAN WG1, Reno, USA; Nov. 14, 2016-Nov. 18, 2016, Nov. 14, 2016 (Nov. 14, 2016), XP051176990, 11 pages. Retrieved from the Internet: URL: http://www.3gpp.org/ftp/Meetings_3GPP Sync/RAN1/Docs/ [retrieved on Nov. 14, 2016].
Huawei et al., "Search Space Design Considerations", Apr. 2017, 3GPP TSG RAN WG1 #88bis-R1-1704202, 2017, 4 pages.
International Search Report and Written Opinion—PCT/US2018/031207—ISA/EPO—dated Jul. 20, 2018.
International Search Report and Written Opinion—PCT/US2017/064294—ISA/EPO—dated Mar. 26, 2018.
Nokia et al., "On Remaining System Information Delivery", 3GPP Draft; R1-1705841, 3rd Generation Partnership Project (3GPP), Mobile Competence Centre; 650, Route des Lucioles; F-06921 Sophia-Antipolis Cedex; France, vol. RAN WG1, No. Spokane, WA, USA; Apr. 3, 2017-Apr. 7, 2017, Apr. 2, 2017, XP051243953, Retrieved from the Internet: URL:http://www.3gpp.org/ftp/Meetings_3GPP_SYNC/RAN1/Docs/ [retrieved on Apr. 2, 2017], 5 pages.
NTT Docomo, Inc., "Discussion on Remaining System Information Delivery in NR", Apr. 2017, 3GPP TSG RAN WG1 #88bis-R1-1705709, 2017, 3 pages.
Samsung: "Configuration and Functionalities of Common Search Space", Apr. 2017, 3GPP TSG RAN WG1 #88bis, R1-1705379, 2017, 3 pages.
Samsung: "Remaining Minimum System Information Delivery", 3GPP TSG RAN WG1 Meeting #90, R1-1713556, Prague, Czechia, Aug. 21-25, 2017, pp. 1-5.
Sengupta S., et al., "SpiderRadio: A Cognitive Radio Network with Commodity Hardware and Open Source Software", IEEE Communications Magazine, IEEE Service Center, Piscataway, US, vol. 49, No. 3, Mar. 1, 2011 (Mar. 1, 2011), pp. 101-109, XP011349626, ISSN: 0163-6804, DOI: 10.11 09/MCOM.2011.5723806.
U.S. Appl. No. 15/968,569, filed May 1, 2018.
NTT Docomo et al., "Further Views on Wider Bandwidth Operations for NR", 3GPP Draft; R1-1708494 Wider BW for NR, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017, XP051273686, Retrieved from the Internet: URL:http://www.3gpp.org/ftp/Meetings_3GPP_SYNC/RAN1/Docs/ [retrieved on May 14, 2017], 6 pages.
Samsung: "Remaining Issues of NR-PBCH", 3GPP TSG RAN WG1 #89, R1-1707929, May 6, 2017, 8 Pages.
Samsung: "SS Frequency Raster for NR", 3GPP Draft; R1-1705319, 3GPP TSG RAN WG1 Meeting #88 bis, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051243449, 4 Pages, Retrieved from the Internet: URL:http://www.3gpp.org/ftp/Meetings_3GPP_SYNC/RAN1/Docs/ [retrieved on Apr. 2, 2017].
Ericsson: "Analysis of Raster Concepts for Frequency Ranges 1 and 2", 3GPP TSG-RAN WG4 Meeting #84, R4-1707742, Berlin, Germany, Aug. 11, 2017, 7 Pages, Aug. 21, 2017-Aug. 25, 2017.
LG Electronics: "Discussion on Sync Raster for NR", 3GPP TSG RAN WG4 Meeting #85, R4-1712852, 3GPP, Reno, Nevada, USA, Nov. 17, 2017, 4 Pages, Nov. 27, 2017-Dec. 1, 2017.
NTT Docomo Inc: "Remaining Details on NR-PBCH", 3GPP TSG RAN WG1 Meeting #91, R1-1720790, 3GPP, Reno, USA, Nov. 18, 2017, 5 Pages., Nov. 27, 2017-Dec. 1, 2017.
OPPO: "Remaining Details of NR PBCH Contents", 3GPP TSG RAN WG1 Meeting #91, R1-1720002, 3GPP, Reno, USA, Nov. 18,

(56) References Cited

OTHER PUBLICATIONS 2017, 3 Pages, Nov. 27, 2017-Dec. 1, 2017.
Spreadtrum Communications: "Association Between SS Blocks and the Corresponding RMSI(s) in Wideband Operation", 3GPP TSG RAN WG1 Meeting #91, R1-1719827, 3GPP, Reno, USA, Nov. 17, 2017, 4 Pages, Nov. 27, 2017-Dec. 1, 2017.
Taiwan Search Report—TW106142114—TIPO—dated Sep. 10, 2020.
Qualcomm Incorporated: "NB-PSS and NB-SSS Design", 3GPP Draft, 3GPP TSG RAN WG1 Meeting #84, R1-160878, Feb. 15-19, 2016, XP051054202, Retrieved from the Internet: URL:http://www.3gpp.org/ftp/Meetings_3GPP_SYNC/RAN1/Docs/ 16 pages.

\* cited by examiner

TECHNIQUES AND APPARATUSES FOR REUSING REMAINING MINIMUM SYSTEM INFORMATION CONFIGURATION BITS TO SIGNAL A SYNCHRONIZATION SIGNAL BLOCK LOCATION

CROSS-REFERENCE TO RELATED APPLICATIONS UNDER 35 U.S.C. § 119

This application is a continuation of International Application No. PCT/US2018/031207, filed May 4, 2018, entitled "TECHNIQUES AND APPARATUSES FOR REUSING REMAINING MINIMUM SYSTEM INFORMATION CONFIGURATION BITS TO SIGNAL A SYNCHRONIZATION SIGNAL BLOCK LOCATION," which is a continuation of U.S. patent application Ser. No. 15/968,569 (now U.S. Pat. No. 10,270,573), filed May 1, 2018, entitled "TECHNIQUES AND APPARATUSES FOR REUSING REMAINING MINIMUM SYSTEM INFORMATION CONFIGURATION BITS TO SIGNAL A SYNCHRONIZATION SIGNAL BLOCK LOCATION," which claims priority to U.S. Provisional Patent Application No. 62/710,295, filed on Feb. 16, 2018, entitled "TECHNIQUES AND APPARATUSES FOR DETERMINING A FREQUENCY POSITION OF A SYNCHRONIZATION SIGNAL BLOCK." U.S. patent application Ser. No. 15/968,569 also claims priority to U.S. Provisional Patent Application No. 62/595,028, filed on Dec. 5, 2017, entitled "TECHNIQUES AND APPARATUSES FOR REUSING REMAINING MINIMUM SYSTEM INFORMATION CONFIGURATION BITS TO SIGNAL A SYNCHRONIZATION SIGNAL BLOCK LOCATION." U.S. patent application Ser. No. 15/968,569 also claims priority to U.S. Provisional Patent Application No. 62/591,116, filed on Nov. 27, 2017, entitled "TECHNIQUES AND APPARATUSES FOR REUSING REMAINING MINIMUM SYSTEM INFORMATION CONFIGURATION BITS TO SIGNAL A SYNCHRONIZATION SIGNAL BLOCK LOCATION." U.S. patent application Ser. No. 15/968,569 also claims priority to U.S. Provisional Patent Application No. 62/506,960, filed on May 16, 2017, entitled "TECHNIQUES AND APPARATUSES FOR COMMON SEARCH SPACE DETERMINATION." All of the above patent applications are hereby expressly incorporated by reference herein.

TECHNICAL FIELD OF THE DISCLOSURE

Aspects of the technology described below generally relate to wireless communication, and more particularly to techniques and apparatuses for reusing remaining minimum system information (RMSI) configuration bits to signal a synchronization signal (SS) block location. Some techniques and apparatuses described herein enable and provide wireless communication devices and systems that conserve network resources, conserve device and system resources, and permit for flexible configuration of a wireless communication system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication may be performed by a UE. The method may include receiving a first synchronization signal (SS) block that does not include remaining minimum system information (RMSI), wherein the first SS block indicates an offset for obtaining a second SS block that includes RMSI; and determining a location of the second SS block based at least in part on the offset.

In some aspects, a UE for wireless communication may include memory and one or more processors operatively coupled to the memory. The memory and the one or more processors may be configured to receive a first synchronization signal (SS) block that does not include remaining minimum system information (RMSI), wherein the first SS block indicates an offset for obtaining a second SS block that includes RMSI; and determine a location of the second SS block based at least in part on the offset.

In some aspects, a non-transitory computer-readable medium may store one or more instructions for wireless communication. The one or more instructions, when executed by one or more processors of a UE, may cause the one or more processors to receive a first synchronization signal (SS) block that does not include remaining minimum system information (RMSI), wherein the first SS block indicates an offset for obtaining a second SS block that includes RMSI; and determine a location of the second SS block based at least in part on the offset.

In some aspects, an apparatus for wireless communication may include means for receiving a first synchronization signal (SS) block that does not include remaining minimum system information (RMSI), wherein the first SS block indicates an offset for obtaining a second SS block that includes RMSI; and means for determining a location of the second SS block based at least in part on the offset.

Aspects generally include a method, apparatus, system, computer program product, non-transitory computer-readable medium, user equipment, base station, mobile communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
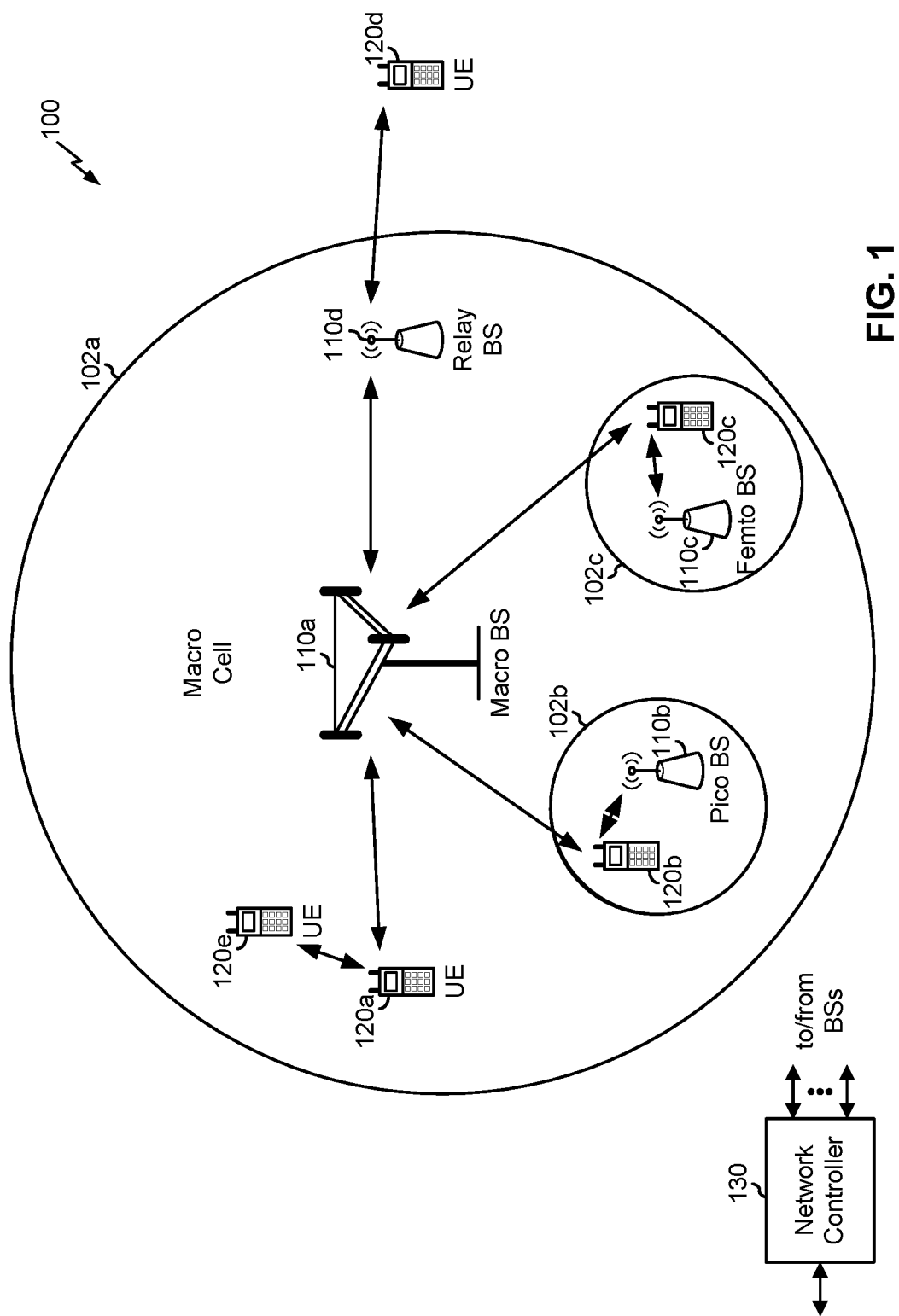
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscriptions. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
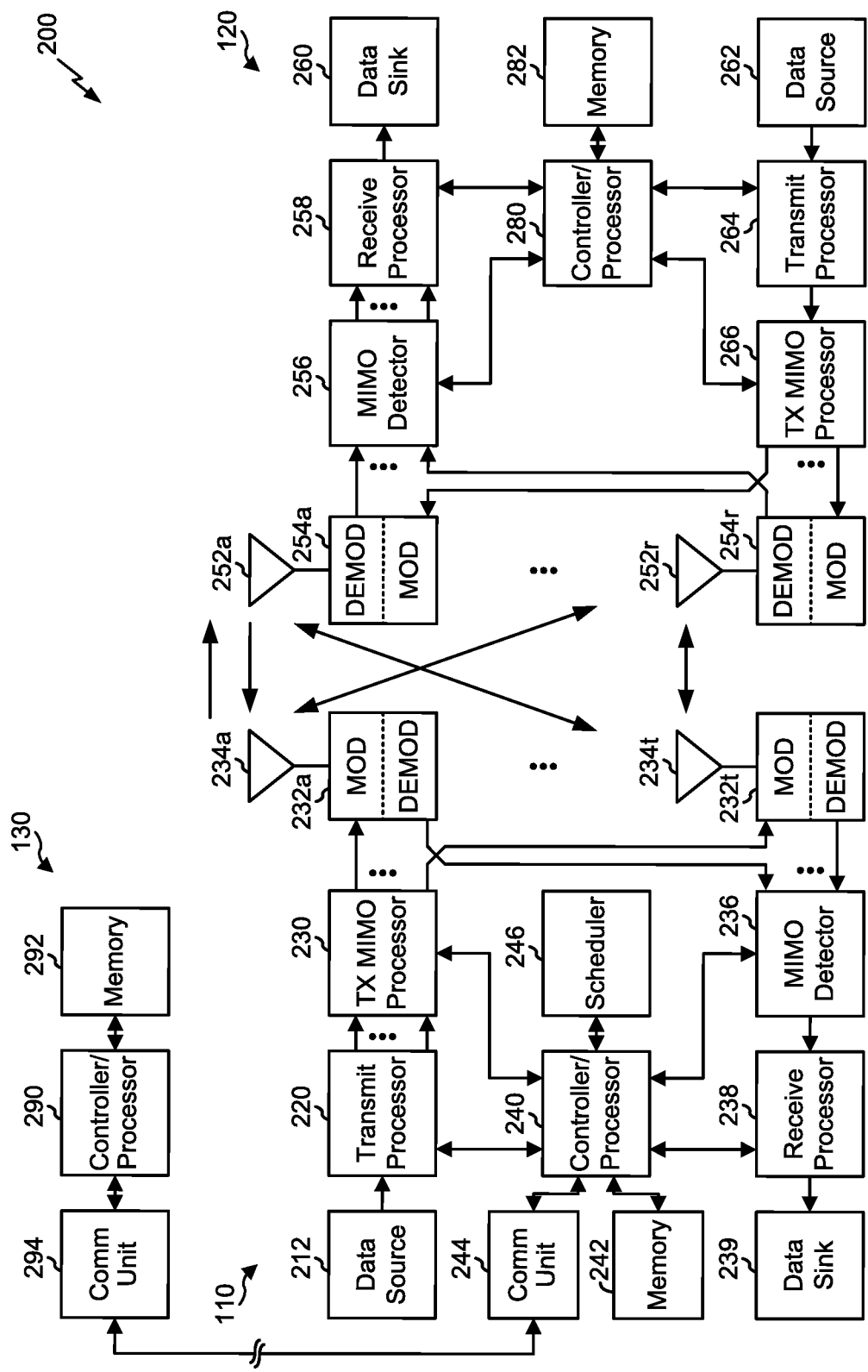
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with reusing RMSI configuration bits to signal an SS block location, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a first synchronization signal (SS) block that does not include remaining minimum system information (RMSI), wherein the first SS block includes an indication of a frequency location of a second SS block that includes RMSI; means for determining the frequency location of the second SS block based at least in part on the indication; means for obtaining the second SS block based at least in part on the frequency location; and/or the like. Additionally, or alternatively, UE 120 may include means for receiving a plurality of wireless signals with at least one signal being a synchronization signal (SS) that comprises a flexible or re-usable portion; means for determining absence or presence of remaining minimum system information (RMSI) data, to determine a frequency location of an SS block, and/or to determine a frequency location of a cell based at least in part on the flexible or re-usable portion; and/or the like. Additionally, or alternatively, UE 120 may include means for receiving a first synchronization signal (SS) block that does not include remaining minimum system information (RMSI), wherein the first SS block indicates an offset for obtaining a second SS block that includes RMSI; means for determining a location of the second SS block based at least in part on the offset; means for obtaining the second SS block based at least in part on the location; and/or the like. In some aspects, such means may include one or more components of UE 120 described in connection with FIG. 2.

In some aspects, base station 110 may include means for determining that a first synchronization signal (SS) block is not to include remaining minimum system information (RMSI); means for determining a frequency location of a second SS block that includes RMSI; means for transmitting an indication, in the first SS block, of the frequency location of the second SS block that includes RMSI based at least in part on determining that the first SS block is not to include RMSI; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
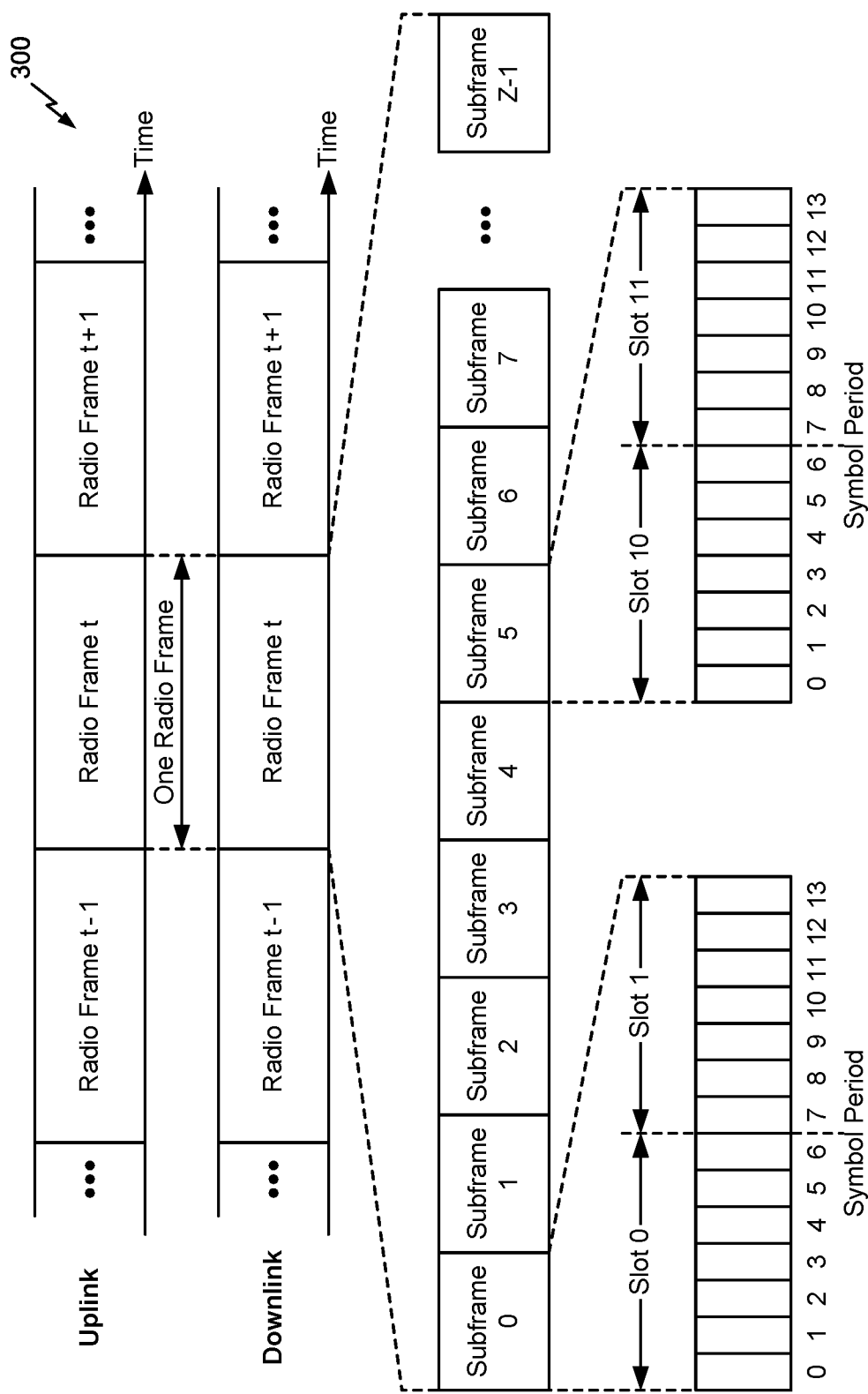
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
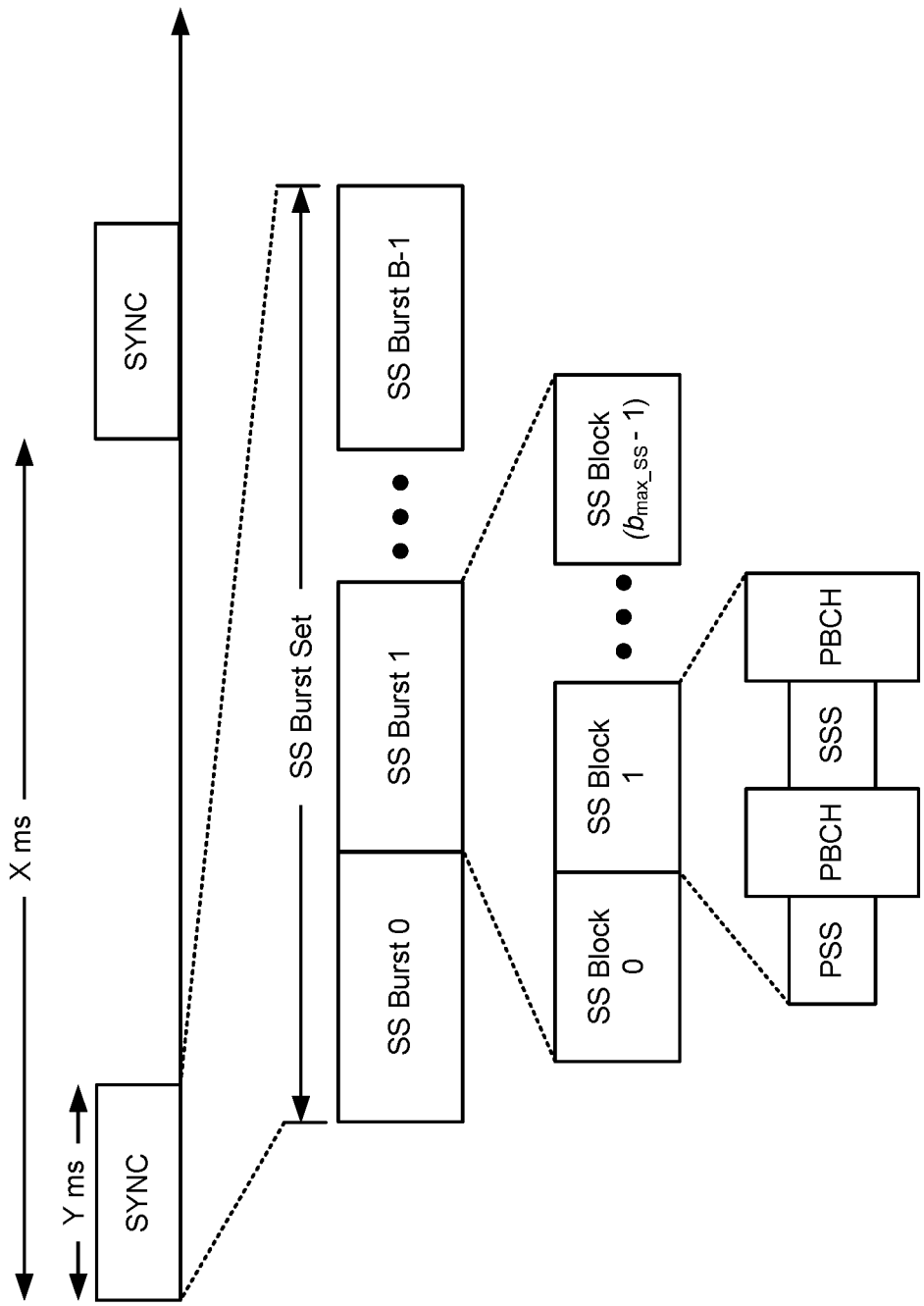
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
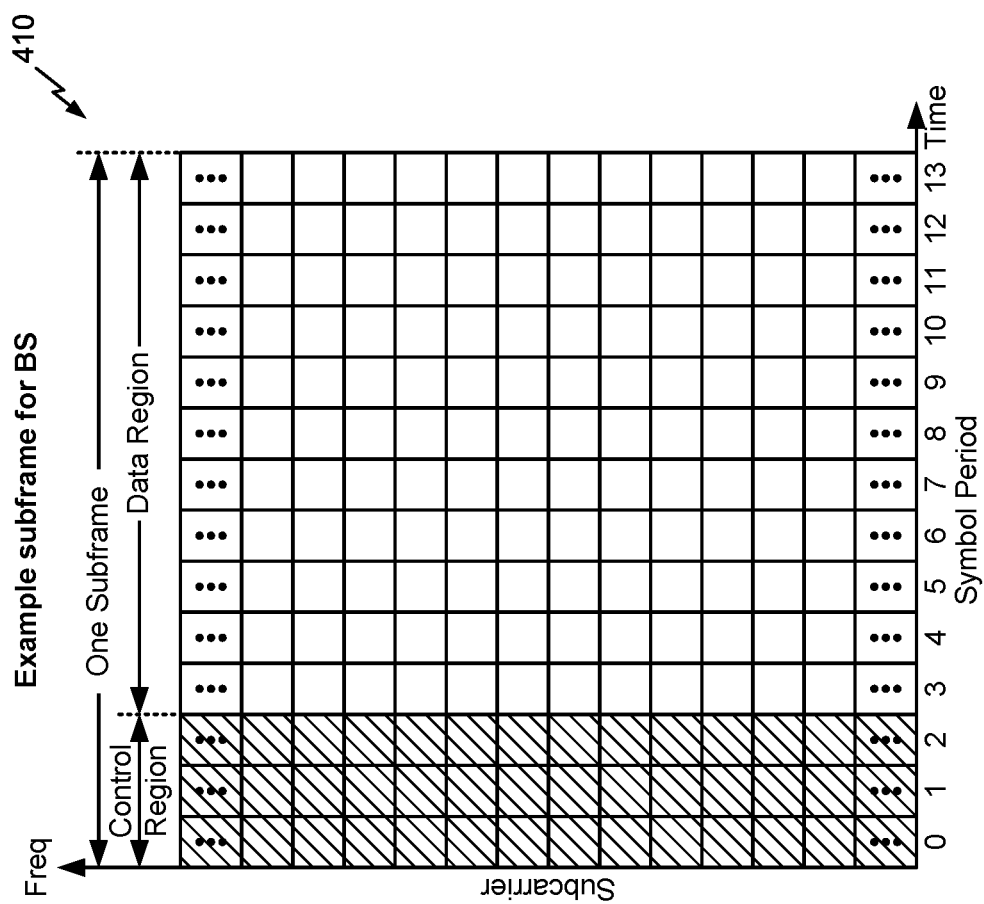
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
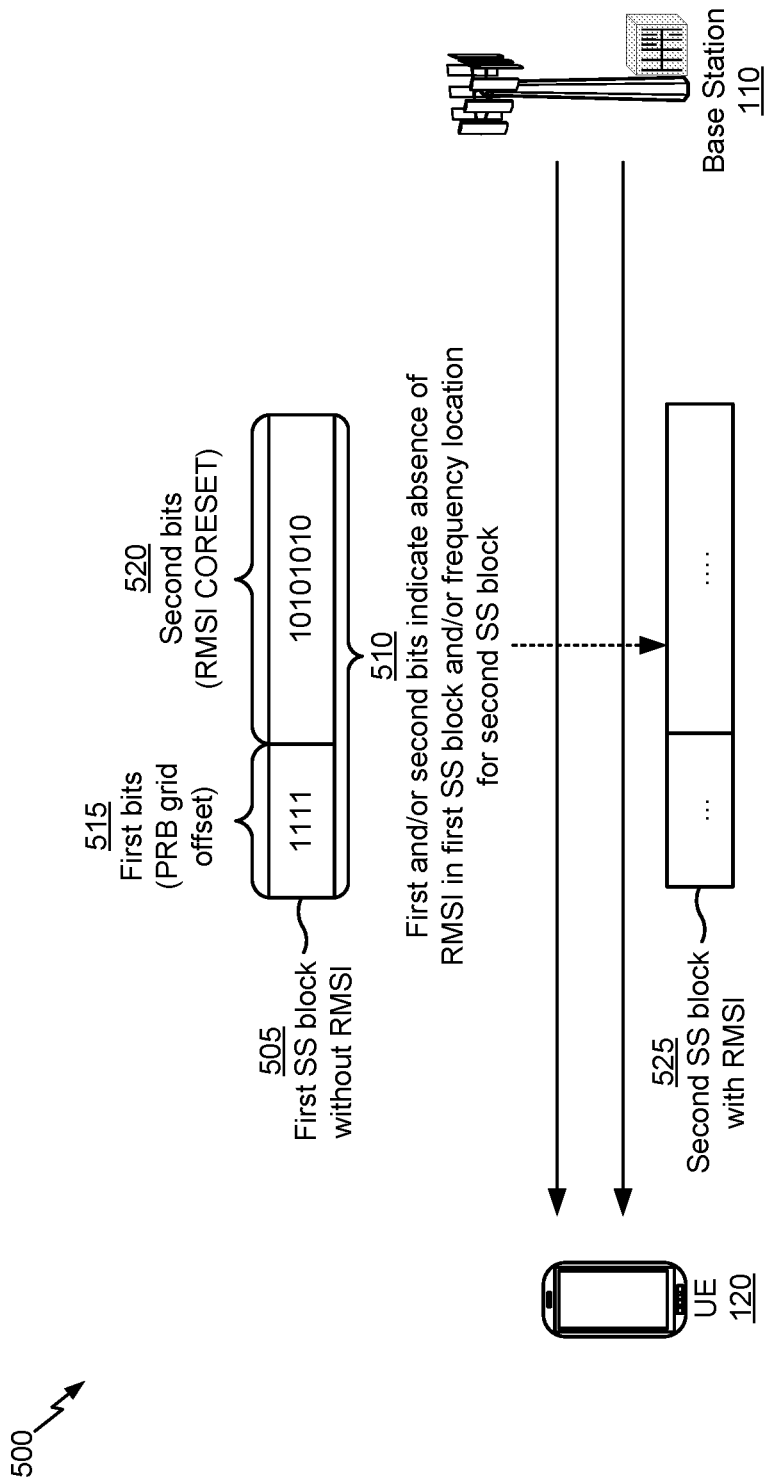
FIG. 5 is a diagram illustrating an example of reusing RMSI configuration bits to signal an SS block location, in accordance with various aspects of the present disclosure.

FIG. 5 is a diagram illustrating an example 500 of reusing RMSI configuration bits to signal an SS block location, in accordance with various aspects of the present disclosure.

In a wireless network, a UE 120 may scan one or more frequencies for SS blocks transmitted by a base station 110. As described above in connection with FIG. 3B, an SS block may include a PSS, an SSS, a PBCH communication, and/or the like. In some aspects, the PBCH communication may include remaining minimum system information (RMSI), such as an RMSI control resource set (CORESET) configuration and/or the like, which may be used by the UE 120 to determine a random access channel (RACH) configuration for performing a RACH procedure for initial access to the base station 110.

In some cases, some SS blocks may include RMSI, and some SS blocks may not include RMSI. In this case, if the UE 120 receives an SS block that does not include RMSI, the UE 120 may continue scanning frequencies until the UE 120 receives an SS block that includes RMSI, and may then use the RMSI to perform the RACH procedure. This scanning may waste resources of the UE 120 (e.g., radio resources, battery power, and/or the like), particularly with a large system bandwidth. Some techniques and apparatuses described herein conserve resources of the UE 120 by reducing an amount of frequency scanning performed by the UE 120. For example, a first SS block without RMSI may indicate a location (e.g., in frequency and/or time) of a second SS block that includes RMSI. In this way, the UE 120 may obtain the RMSI in the second SS block without unnecessary scanning.

As shown by reference number 505, the base station 110 may transmit, and the UE 120 may receive, a first SS block that does not include RMSI. In some aspects, the first SS block may be transmitted and/or received via a first frequency. Additionally, or alternatively, the UE 120 may obtain the first SS block during a scan by the UE 120 of one or more frequencies included in a synchronization raster. The synchronization raster may include a set of frequencies to be scanned by the UE 120 to obtain RMSI for a RACH procedure.

As shown by reference number 510, the first SS block may include an indication of a frequency location of a second SS block that includes RMSI. In this way, the UE 120 may quickly locate the second SS block to obtain RMSI when the first SS block does not include RMSI. Additionally, or alternatively, the first SS block may include an indication that the first SS block does not include RMSI. In this way, the UE 120 may conserve resources that would otherwise be used to decode a portion of the first SS block that includes RMSI.

In some aspects, as shown by reference number 515, the first SS block may include a first set of bits for indicating a physical resource block (PRB) grid offset (e.g., a grid offset between SS blocks and RMSI). For example, the first set of bits may include four bits. Additionally, or alternatively, as shown by reference number 520, the first SS block may include a second set of bits for indicating an RMSI control resource set (CORESET) configuration. For example, the second set of bits may include eight bits. In some aspects, the first set of bits and/or the second set of bits may be reused (e.g., repurposed) to indicate that the first SS block does not include RMSI and/or to indicate a frequency location of the second SS block that includes RMSI. As used herein, an indication in the first SS block (e.g., an indication of a frequency location, a time location, a periodicity, a presence or absence of RMSI, and/or the like) may be indicated using only the first set of bits, using only the second set of bits, using all of the bits included in the first set of bits and the second set of bits, or using some combination of bits from the first set of bits and/or the second set of bits.

In some aspects, the first set of bits may indicate whether the first SS block includes RMSI. For example, some bit sequences (e.g., 12 of 16 possible bit sequences of 4 bits) of the first set of bits may indicate different PRB grid offsets, and other bit sequences may indicate presence or absence of RMSI in the first SS block (e.g., using an RMSI presence flag, an RMSI absence flag, and/or the like). For example, a first bit sequence (e.g., 1111) of the first set of bits may indicate that the first SS block does not include RMSI. Additionally, or alternatively, a second bit sequence (e.g., 0000) of the first set of bits may indicate that the first SS block includes RMSI.

In some aspects, the second set of bits may indicate a frequency location of the second SS block that includes RMSI. For example, different bit sequences of the second set of bits may correspond to different frequency locations of the second SS block. Additionally, or alternatively, a combination of the first set of bits and the second set of bits may indicate the frequency location. For example, the base station 110 and the UE 120 may store corresponding tables that map bit sequences of the first set of bits and/or the second set of bits to different indications associated with the second SS block. In this way, the second set of bits, which may be used to indicate an RMSI configuration when the SS block includes RMSI, may be used to indicate a location of a second SS block that includes RMSI when the first SS block does not include RMSI.

Additionally, or alternatively, the first SS block may indicate (e.g., using the first set of bits and/or the second set of bits) a time location of the second SS block, a periodicity associated with the second SS block, and/or the like. In this way, the UE 120 may obtain the second SS block without scanning the frequency location of the SS block longer than necessary.

In some aspects, the first SS block may indicate (e.g., using the first set of bits and/or the second set of bits) a plurality of frequency locations associated with a plurality of SS blocks. In some aspects, the plurality of SS blocks may each include RMSI. In this way, the UE 120 may select a particular SS block to obtain from the plurality of SS blocks. For example, the UE 120 may select an SS block that is closest in frequency to the first SS block (e.g., to reduce resources used to change frequencies), may select an SS block that is closest in time to the first SS block (e.g., to reduce delays associated with performing a RACH procedure), may select an SS block according to a capability of the UE 120, and/or the like.

In some aspects, the second SS block may be a cell-defining SS block (e.g., an SS block used for defining a cell, an SS block that includes a cell identifier, and/or the like). As an example, the first set of bits and the second set of bits may indicate a single cell-defining SS block, an offset of the cell-defining SS block, such as an indication of a positive offset or a negative offset and/or a value of the offset (e.g., with a granularity of the synchronization raster), and/or the like. For example, a value of positive four may indicate that a cell-defining SS block is located at the fourth valid synchronization raster point above (e.g., at a higher frequency than) the current SS block synchronization raster location. The range of the offset can cover the positive or negative maximum channel bandwidth of the frequency band. In some aspects, the first SS block may indicate (e.g., using the first set of bits and/or the second set of bits) whether the second SS block is a cell-defining SS block. In this way, the UE 120 may obtain a cell-defining SS block or an SS block other than a cell-defining SS block according to one or more requirements of the UE 120.

In some aspects, the first SS block may indicate (e.g., using the first set of bits and/or the second set of bits) whether a frequency via which the first SS block is received is a highest frequency or a lowest frequency that carries an SS block within a frequency band or a carrier associated with the first SS block. In this way, the UE 120 may determine whether the UE 120 needs to scan higher or lower frequencies within the frequency band and/or carrier to obtain SS blocks. Additionally, or alternatively, the first SS block may indicate that there are no additional cell-defining SS blocks in the same carrier as the first SS block. Additionally, or alternatively, the first SS block may indicate a range of bandwidth, around the carrier of the first SS block, in which there are no additional cell-defining SS blocks. For example, the first SS block may indicate that for (+X, −Y) MHz around the carrier, there are no additional cell-defining SS blocks, where X and/or Y can be assigned a frequency value from a set of frequency values, such as 10 Mhz, 20 Mhz, 40 Mhz, and/or the like, up to a maximum bandwidth of the component carrier of the first SS block. In some aspects, the range (e.g., upper range X or lower range Y) may be configured from a set of values, such as 10 MHz, 20 MHz, 40 MHz, maximum bandwidth, and/or the like.

In some aspects, the second SS block is located within a synchronization raster to be scanned by the UE 120 to obtain SS blocks. In some aspects, the second SS block is not located within a synchronization raster to be scanned by the UE 120 to obtain SS blocks. In this way, the base station 110 may indicate a location of an SS block that the UE 120 would not normally obtain by scanning the synchronization raster.

In some aspects, the first SS block may indicate (e.g., using the first set of bits and/or the second set of bits) rate matching information. Additionally, or alternatively, the first SS block may indicate (e.g., using the first set of bits and/or the second set of bits) a configuration associated with obtaining SS blocks on a neighbor cell. In this way, network resources may be conserved by reusing bits to convey this information rather than using different bits.

In some aspects, the base station 110 may determine that the first SS block is not to include RMSI, may determine a frequency location of the second SS block that includes RMSI (and/or another indication associated with the second SS block), and may transmit, in the first SS block, an indication of the frequency location (and/or another indication associated with the SS block) based at least in part on determining that the first SS block is not to include RMSI. In this way, the base station 110 may reduce the amount of scanning done by the UE 120, thereby conserving resources.

As shown by reference number 525, the base station 110 may transmit, and the UE 120 may receive, the second SS block that includes RMSI. The UE 120 may determine a frequency location of the second SS block based at least in part on the indication included in the first SS block, and may obtain the second SS block based at least in part on the frequency location and/or other indications associated with the second SS block (e.g., a time location, a periodicity, and/or the like). In some aspects, the UE 120 may monitor the frequency location for the second SS block without scanning other frequencies, thereby conserving resources of the UE 120.

In some frequency ranges (e.g., 0 to 2650 MHz), SS blocks may be transmitted at one or more frequency positions within a frequency window (e.g., 3 potential frequency positions within a frequency window of 10 kHz, such as M*5 kHz, where M=−1:1). This frequency window may be referred to as a synchronization raster cluster, and may indicate multiple possible frequency positions for SS blocks. In some aspects, each frequency position may have a corresponding global synchronization channel number (GSCN), which may be used for signaling a frequency position using less overhead. For example, a GSCN of 1 may correspond to a frequency position of 895 kHz, a GSCN of 2 may correspond to a frequency position of 900 kHz, and a GSCN of 3 may correspond to a frequency position of 905 kHz, and/or the like. These three frequency positions may be included in a synchronization raster cluster defined by an offset of −5 kHz (e.g., a lower frequency of 895 kHz) and an offset of +5 kHz (e.g., an upper frequency of 905 kHz) from a middle frequency of 900 kHz. In some cases, a UE 120 may receive a first SS block at a first frequency position, which may be one of the frequency positions within the synchronization raster cluster. The first SS block may include an offset value, referred to herein as a synchronization raster offset, that indicates a second frequency position of a second SS block relative to the first frequency position of the first SS block. For example, the first SS block may be received at 900 kHz, corresponding to a GSCN of 2, and may include a synchronization raster offset value of +4. This may indicate that the second SS block is positioned at 1805 kHz, which corresponds to a GSCN of 6, which is four GSCNs greater than (e.g., +4) the GSCN of the first SS block.

However, because the synchronization raster cluster may be a tight frequency window (e.g., 10 kHz), the UE 120 may incorrectly estimate the first frequency position at which the first SS block is received. In this case, the UE 120 may incorrectly determine a second frequency position for the second SS block when the offset is applied to the first frequency position. Continuing with the above example, if the UE 120 estimates the frequency position of the first SS block as 905 kHz instead of 900 kHz, then the UE 120 may incorrectly determine a GSCN of 3 for the first SS block. When applying the offset of +4, the UE 120 would determine a GSCN of 7 for the second SS block, corresponding to a frequency position of 2695 kHz. In this case, the UE 120 would scan a frequency of 2695 kHz for the second SS block, but the second SS block may actually be transmitted at 1805 kHz. As a result, the UE 120 may not be able to obtain the second SS block, may experience a delay in connecting to a wireless network, and/or may waste resources by resorting to a frequency scan after experiencing an error obtaining the second SS block.

In some aspects, the UE 120 may map a frequency estimate of the first frequency position of the first SS block to a default frequency position in the synchronization raster cluster (e.g., an upper frequency, a middle frequency, a lower frequency, and/or the like). The UE 120 may then apply a synchronization raster offset to the default frequency position to obtain a second frequency position of the second SS block. In this way, the UE 120 may more accurately determine a frequency position for an SS block that includes RMSI, may reduce scanning errors, and/or the like, which may result in faster network access, less battery consumption, and/or the like.

As indicated above, FIG. 5 is provided as an example. Other examples are possible and may differ from what was described with respect to FIG. 5.

Figure 6:
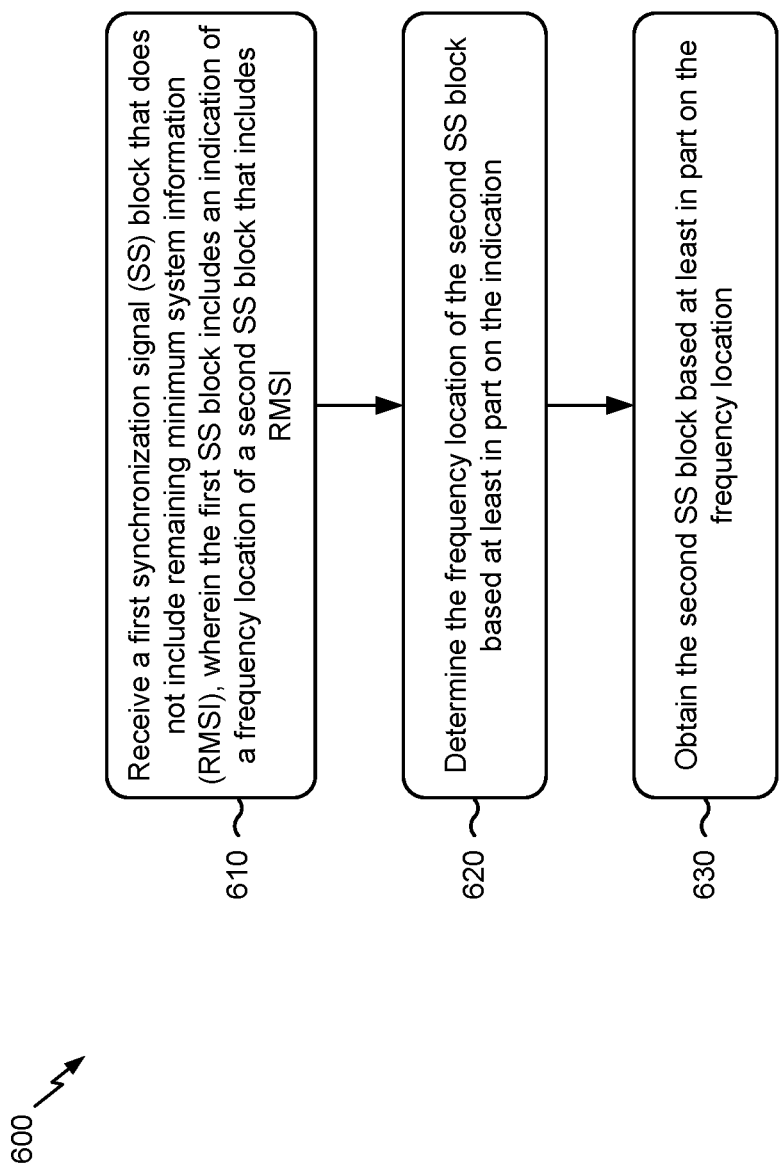
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) reuses RMSI configuration bits to determine an SS block location.

As shown in FIG. 6, in some aspects, process 600 may include receiving a first synchronization signal (SS) block that does not include remaining minimum system information (RMSI), wherein the first SS block includes an indication of a frequency location of a second SS block that includes RMSI (block 610). For example, the UE (e.g., using antenna 252, DEMOD 254, MIMO detector 256, receive processor 258, controller/processor 280, and/or the like) may receive a first SS block that does not include RMSI, as described above in connection with FIG. 5. In some aspects, the first SS block includes an indication of a frequency location of a second SS block that includes RMSI.

As further shown in FIG. 6, in some aspects, process 600 may include determining the frequency location of the second SS block based at least in part on the indication (block 620). For example, the UE (e.g., using controller/processor 280 and/or the like) may determine the frequency location of the second SS block based at least in part on the indication, as described above in connection with FIG. 5.

As further shown in FIG. 6, in some aspects, process 600 may include obtaining the second SS block based at least in part on the frequency location (block 630). For example, the UE (e.g., using antenna 252, DEMOD 254, MIMO detector 256, receive processor 258, controller/processor 280, and/or the like) may obtain the second SS block based at least in part on the frequency location, as described above in connection with FIG. 5.

Process 600 may include additional aspects, such as any single aspect or any combination of aspects described below and/or in connection with one or more other processes described elsewhere herein.

In some aspects, the indication further indicates that the first SS block does not include RMSI. In some aspects, the indication is indicated using at least one of: a first set of bits for signaling a physical resource block grid offset, a second set of bits for signaling an RMSI control resource set configuration, or some combination thereof. In some aspects, the indication indicates that the first SS block does not include RMSI using a first set of bits associated with signaling a physical resource block grid offset; and the indication indicates the frequency location of the second SS block using at least one of the first set of bits or a second set of bits associated with signaling an RMSI control resource set configuration.

In some aspects, the indication further indicates a time location of the second SS block. In some aspects, the indication further indicates a periodicity associated with the second SS block. In some aspects, the indication indicates a plurality of frequency locations, including the frequency location, associated with a plurality of SS blocks including the second SS block. In some aspects, the second SS block is a cell-defining SS block. In some aspects, the indication further indicates that the second SS block is a cell-defining SS block. In some aspects, the indication further indicates that a frequency via which the first SS block is received is a highest frequency or a lowest frequency that carries an SS block within a frequency band or a carrier associated with the first SS block.

In some aspects, the second SS block is located on the synchronization raster to be scanned by the UE to obtain SS blocks. In some aspects, the second SS block is not located on the synchronization raster to be scanned by the UE to obtain SS blocks (e.g., the second SS block may be an off-raster SS block). In some aspects, the first set of bits and the second set of bits (e.g., that indicate the PRB grid and the RMSI configuration) in the off-raster SSB may not provide any information regarding PRB grid and/or RMSI configuration, and/or may not provide any information about the location of other SS blocks. This can be achieved by setting or hard coding the first set of bits and the second set of bits in the off-raster SS block to a particular value (e.g., all ones). This hard coding can be used to enhance PBCH decoding for the off-raster SS block. In some aspects, the indication further indicates rate matching information. In some aspects, the indication further indicates a configuration associated with obtaining SS blocks on a neighbor cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
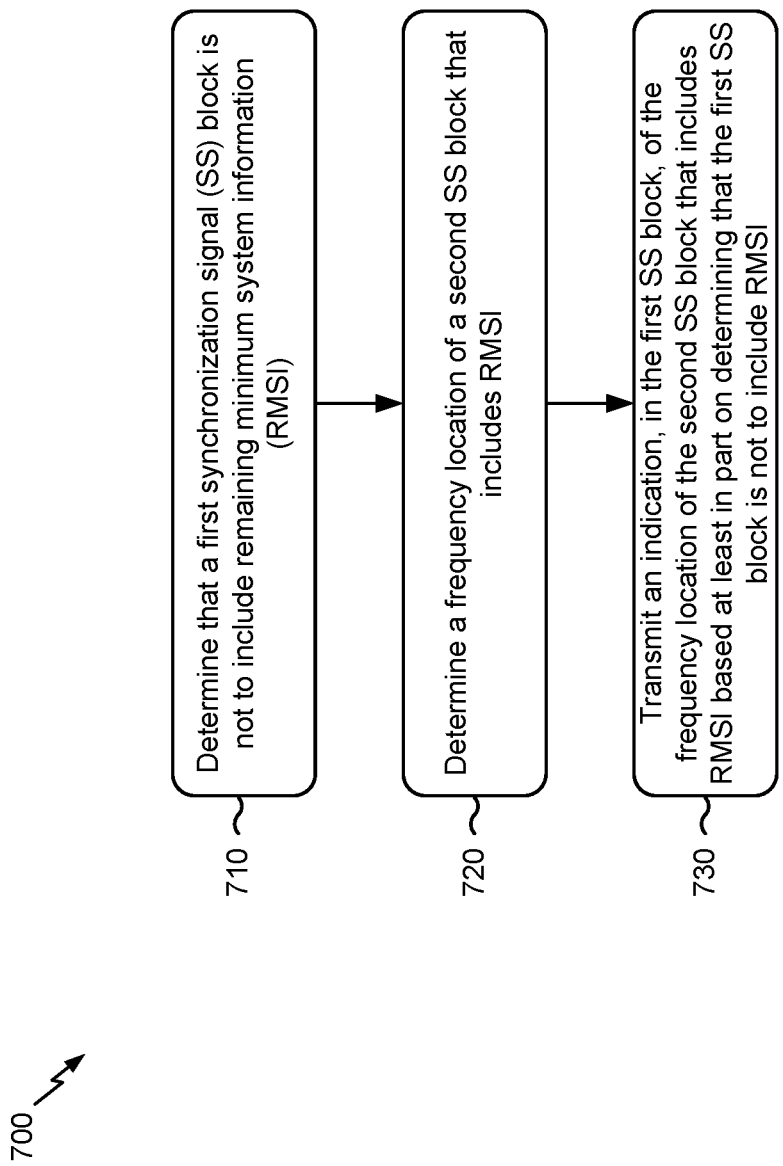
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., base station 110 and/or the like) reuses RMSI configuration bits to signal an SS block location.

As shown in FIG. 7, in some aspects, process 700 may include determining that a first synchronization signal (SS) block is not to include remaining minimum system information (RMSI) (block 710). For example, the base station (e.g., using controller/processor 240 and/or the like) may determine that a first SS block is not to include RMSI, as described above in connection with FIG. 5.

As further shown in FIG. 7, in some aspects, process 700 may include determining a frequency location of a second SS block that includes RMSI (block 720). For example, the base station (e.g., using controller/processor 240 and/or the like) may determine a frequency location of a second SS block that includes RMSI, as described above in connection with FIG. 5.

As further shown in FIG. 7, in some aspects, process 700 may include transmitting an indication, in the first SS block, of the frequency location of the second SS block that includes RMSI based at least in part on determining that the first SS block is not to include RMSI (block 730). For example, the base station (e.g., using controller/processor 240, transmit processor 220, TX MIMO processor 230, MOD 232, antenna 234, and/or the like) may transmit an indication, in the first SS block, of the frequency location of the second SS block that includes RMSI, as described above in connection with FIG. 5. In some aspects, the base station may transmit the indication based at least in part on determining that the first SS block is not to include RMSI.

Process 700 may include additional aspects, such as any single aspect or any combination of aspects described above in connection with FIG. 6.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
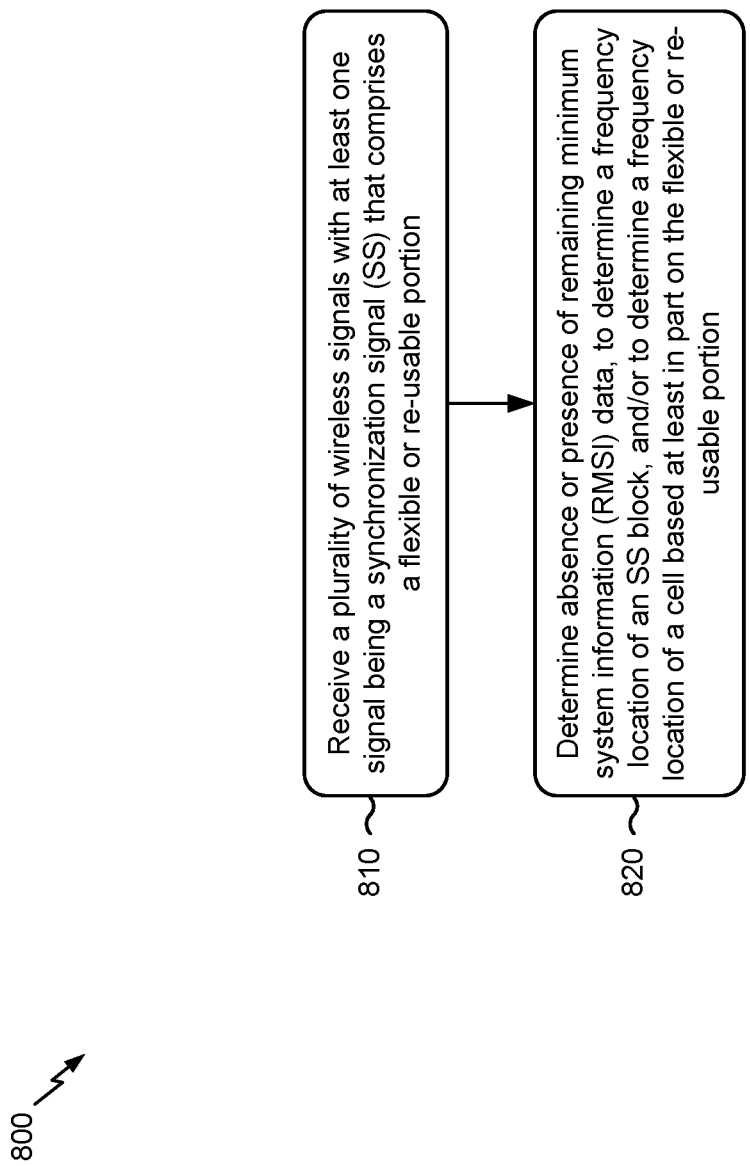
FIG. 8 is a diagram illustrating an example process performed, for example, by a base station, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) reuses RMSI configuration bits to determine an SS block location.

As shown in FIG. 8, in some aspects, process 800 may include receiving a plurality of wireless signals with at least one signal being a synchronization signal (SS) that comprises a flexible or re-usable portion (block 810). For example, the UE (e.g., using antenna 252, DEMOD 254, MIMO detector 256, receive processor 258, controller/processor 280, and/or the like) may receive a plurality of wireless signals with at least one signal being a synchronization signal (SS) that comprises a flexible or re-usable portion, as described above in connection with FIG. 5.

As further shown in FIG. 8, in some aspects, process 800 may include determining absence or presence of remaining minimum system information (RMSI) data, to determine a frequency location of an SS block, and/or to determine a frequency location of a cell based at least in part on the flexible or re-usable portion (block 820). For example, the UE (e.g., using controller/processor 280 and/or the like) may determine absence or presence of remaining minimum system information (RMSI) data, to determine a frequency location of an SS block, and/or to determine a frequency location of a cell based at least in part on the flexible or re-usable portion, as described above in connection with FIG. 5.

Process 800 may include additional aspects, such as any single aspect or any combination of aspects described above in connection with FIG. 6.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
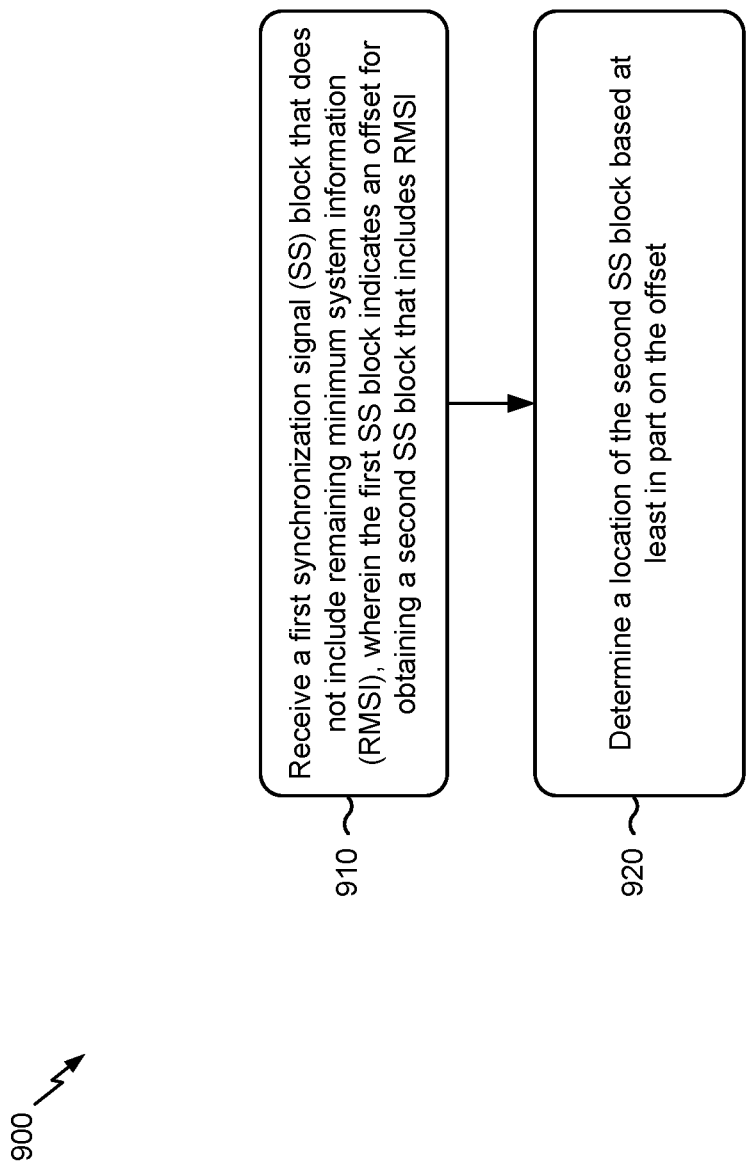
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) reuses RMSI configuration bits to determine an SS block location.

As shown in FIG. 9, in some aspects, process 900 may include receiving a first synchronization signal (SS) block that does not include remaining minimum system information (RMSI), wherein the first SS block indicates an offset for obtaining a second SS block that includes RMSI (block 910). For example, the UE (e.g., using antenna 252, DEMOD 254, MIMO detector 256, receive processor 258, controller/processor 280, and/or the like) may receive a first SS block that does not include RMSI, as described above in connection with FIG. 5. In some aspects, the first SS block indicates an offset for obtaining a second SS block that includes RMSI.

As further shown in FIG. 9, in some aspects, process 900 may include determining a location of the second SS block based at least in part on the offset (block 920). For example, the UE (e.g., using controller/processor 280 and/or the like) may determine a location of the second SS block based at least in part on the offset, as described above in connection with FIG. 5.

Process 900 may include additional aspects, such as any single aspect or any combination of aspects described below and/or in connection with one or more other processes described elsewhere herein.

In some aspects, the UE may obtain the second SS block based at least in part on the location. In some aspects, the first SS block further indicates that the first SS block does not include RMSI. In some aspects, the offset is indicated using at least one of: a first set of bits for signaling a physical resource block grid offset, a second set of bits for signaling an RMSI control resource set configuration, or some combination thereof. In some aspects, the offset is indicated using a positive value or a negative value to indicate the location of the second SS block relative to the first SS block.

In some aspects, the first SS block indicates that the first SS block does not include RMSI using a first set of bits associated with signaling a physical resource block grid offset; and the offset is indicated using at least one of the first set of bits or a second set of bits associated with signaling an RMSI control resource set configuration. In some aspects, the second SS block is a cell-defining SS block.

In some aspects, the offset indicates a synchronization raster location of the second SS block relative to a synchronization raster location of the first SS block. In some aspects, the offset indicates the location of the second SS block using a granularity of the synchronization raster. In some aspects, the first SS block indicates a range of bandwidth, around a carrier of the first SS block, in which there are no cell-defining SS blocks.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a synchronization signal (SS) block that does not include a remaining minimum system information (RMSI) control resource set configuration, wherein the SS block indicates an upper bandwidth offset and a lower bandwidth offset; and
    determining a range of bandwidth, around a carrier of the SS block, in which there are no cell-defining SS blocks based at least in part on the upper bandwidth offset and the lower bandwidth offset.

2. The method of claim 1, where the upper bandwidth offset is indicated using a positive value, and
    where the lower bandwidth offset is indicated using a negative value.

3. The method of claim 1, where the upper bandwidth offset is assigned a first frequency value, and
    where the lower bandwidth offset is assigned a second frequency value.

4. The method of claim 1, where each of the upper bandwidth offset and the lower bandwidth offset is assigned a frequency value up to a maximum bandwidth of the carrier of the SS block.

5. The method of claim 1, where the SS block indicates there are no additional cell-defining SS blocks in the carrier of the SS block.

6. The method of claim 1, further comprising:
monitoring a frequency location for another SS block based at least in part on the range of bandwidth.

7. The method of claim 1, further comprising:
monitoring a frequency location for another SS block without scanning frequencies within the range of bandwidth.

8. The method of claim 1, wherein the upper bandwidth offset and the lower bandwidth offset are assigned frequency values from a set of frequency values.

9. A user equipment (UE) for wireless communication, comprising:
memory; and
one or more processors operatively coupled to the memory, the memory and the one or more processors configured to:
receive a synchronization signal (SS) block that does not include a remaining minimum system information (RMSI) control resource set configuration, wherein the SS block indicates an upper bandwidth offset and a lower bandwidth offset; and
determine a range of bandwidth, around a carrier of the SS block, in which there are no cell-defining SS blocks based at least in part on the upper bandwidth offset and the lower bandwidth offset.

10. The UE of claim 9, where the upper bandwidth offset is indicated using a positive value, and
where the lower bandwidth offset is indicated using a negative value.

11. The UE of claim 9, where the upper bandwidth offset is assigned a first frequency value, and
where the lower bandwidth offset is assigned a second frequency value.

12. The UE of claim 9, where each of the upper bandwidth offset and the lower bandwidth offset is assigned a frequency value up to a maximum bandwidth of the carrier of the SS block.

13. The UE of claim 9, where the SS block indicates there are no additional cell-defining SS blocks in the carrier of the SS block.

14. The UE of claim 9, where the one or more processors are further configured to:
monitor a frequency location for another SS block based at least in part on the range of bandwidth.

15. The UE of claim 9, where the one or more processors are further configured to:
monitor a frequency location for another SS block without scanning frequencies within the range of bandwidth.

16. The UE of claim 9, wherein the upper bandwidth offset and the lower bandwidth offset are assigned frequency values from a set of frequency values.

17. A non-transitory computer-readable medium storing one or more instructions for wireless communication, the one or more instructions comprising:
one or more instructions that, when executed by one or more processors of a user equipment (UE), cause the one or more processors to:
receive a synchronization signal (SS) block that does not include a remaining minimum system information (RMSI) control resource set configuration, wherein the SS block indicates an upper bandwidth offset and a lower bandwidth offset; and
determine a range of bandwidth, around a carrier of the SS block, in which there are no cell-defining SS blocks based at least in part on the upper bandwidth offset and the lower bandwidth offset.

18. The non-transitory computer-readable medium of claim 17, where the upper bandwidth offset is indicated using a positive value, and
where the lower bandwidth offset is indicated using a negative value.

19. The non-transitory computer-readable medium of claim 17, where the upper bandwidth offset is assigned a first frequency value, and
where the lower bandwidth offset is assigned a second frequency value.

20. The non-transitory computer-readable medium of claim 17, where each of the upper bandwidth offset and the lower bandwidth offset is assigned a frequency value up to a maximum bandwidth of the carrier of the SS block.

21. The non-transitory computer-readable medium of claim 17, where the SS block indicates there are no additional cell-defining SS blocks in the carrier of the SS block.

22. The non-transitory computer-readable medium of claim 17, where the one or more instructions further cause the one or more processors to:
monitor a frequency location for another SS block based at least in part on the range of bandwidth.

23. The non-transitory computer-readable medium of claim 17, where the one or more instructions further cause the one or more processors to:
monitor a frequency location for another SS block without scanning frequencies within the range of bandwidth.

24. The non-transitory computer-readable medium of claim 17, wherein the upper bandwidth offset and the lower bandwidth offset are assigned frequency values from a set of frequency values.

25. An apparatus for wireless communication, comprising:
means for receiving a synchronization signal (SS) block that does not include a remaining minimum system information (RMSI) control resource set configuration, wherein the SS block indicates an upper bandwidth offset and a lower bandwidth offset; and
means for determining a range of bandwidth, around a carrier of the SS block, in which there are no cell-defining SS blocks based at least in part on the upper bandwidth offset and the lower bandwidth offset.

26. The apparatus of claim 25, where the upper bandwidth offset is indicated using a positive value, and
where the lower bandwidth offset is indicated using a negative value.

27. The apparatus of claim 25, where the upper bandwidth offset is assigned a first frequency value, and
where the lower bandwidth offset is assigned a second frequency value.

28. The apparatus of claim 25, where each of the upper bandwidth offset and the lower bandwidth offset is assigned a frequency value up to a maximum bandwidth of the carrier of the SS block.

29. The apparatus of claim 25, where the SS block indicates there are no additional cell-defining SS blocks in the carrier of the SS block.

30. The apparatus of claim 25, further comprising:
means for monitoring a frequency location for another SS block based at least in part on the range of bandwidth.

* * * * *